United States Patent
Chang et al.

(10) Patent No.: US 10,116,588 B2
(45) Date of Patent: Oct. 30, 2018

(54) LARGE RECEIVE OFFLOAD ALLOCATION METHOD AND NETWORK DEVICE

(71) Applicant: MEDIATEK INC., Hsin-Chu (TW)

(72) Inventors: Chia-Hsiang Chang, Hsinchu County (TW); Tsung-Yueh Hsieh, Tainan (TW); Hsun-Wen Wang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 423 days.

(21) Appl. No.: 14/715,560

(22) Filed: May 18, 2015

(65) Prior Publication Data

US 2016/0315875 A1 Oct. 27, 2016

Related U.S. Application Data

(60) Provisional application No. 62/150,832, filed on Apr. 21, 2015.

(51) Int. Cl.
| | |
|---|---|
| *H04L 1/00* | (2006.01) |
| *H04L 12/26* | (2006.01) |
| *H04L 12/927* | (2013.01) |
| *H04L 12/931* | (2013.01) |
| *H04L 12/935* | (2013.01) |
| *H04L 29/06* | (2006.01) |

(52) U.S. Cl.
CPC ............ *H04L 47/805* (2013.01); *H04L 49/30* (2013.01); *H04L 49/351* (2013.01); *H04L 49/602* (2013.01); *H04L 69/161* (2013.01)

(58) Field of Classification Search
CPC ..... H04L 49/30; H04L 69/161; H04L 47/805; H04L 49/602; H04L 49/351; H04L 12/927; H04L 29/06
See application file for complete search history.

(56) References Cited

U.S. PATENT DOCUMENTS

| | | | |
|---|---|---|---|
| 8,306,062 B1 | 11/2012 | Cohen | |
| 2004/0057459 A1* | 3/2004 | Sharony | H04L 47/14 370/468 |
| 2004/0203824 A1* | 10/2004 | Mock | H04W 48/14 455/452.1 |

(Continued)

OTHER PUBLICATIONS

Gianni Antichi et al., Implementation of TCP Large Receive Offload on Open Hardware Platform, 2013, pp. 15-21, XP058020711.

*Primary Examiner* — Yemane Mesfin
*Assistant Examiner* — Abdelillah Elmejjarmi
(74) *Attorney, Agent, or Firm* — Winston Hsu

(57) ABSTRACT

An allocation method, utilized in a network device comprising an large receive offload (LRO) engine having LRO rings, includes receiving packets which belong to data streams; recording information of the data streams according to the packets; determining priority values corresponding to the data streams according to the information of the data streams; determining a first data stream within the data streams corresponding to a first priority value which is greater than a predefined value; and when there is an available LRO ring within the LRO rings, allocating the available LRO ring to the first data stream; wherein when an LRO ring is allocated to a data stream, a plurality of incoming packets of the data stream are stored in the LRO ring, and the incoming packets stored in the LRO ring are aggregated into large packets by the LRO engine.

6 Claims, 2 Drawing Sheets

(56) References Cited

U.S. PATENT DOCUMENTS

| | | | | |
|---|---|---|---|---|
| 2011/0110237 A1* | 5/2011 | Wong | ...................... | H04L 49/30 |
| | | | | 370/236 |
| 2014/0380433 A1* | 12/2014 | Yerger | .................. | H04L 63/107 |
| | | | | 726/4 |
| 2016/0092259 A1* | 3/2016 | Mehta | ................. | G06F 9/45558 |
| | | | | 718/1 |
| 2016/0218976 A1* | 7/2016 | Agarwal | ............... | H04L 47/115 |

* cited by examiner

LARGE RECEIVE OFFLOAD ALLOCATION METHOD AND NETWORK DEVICE

CROSS REFERENCE TO RELATED APPLICATIONS

This application claims the benefit of U.S. provisional application No. 62/150,832, filed on Apr. 21, 2015 and incorporated herein by reference.

BACKGROUND

The present invention relates to a large receive offload (LRO) method and a network device, and more particularly, to an LRO method and a network device capable of utilizing the LRO rings efficiently.

The amount of web traffic over the internet is increasing. Much of the increase in web traffic is due to increased social media usage, cloud based storage, online media steaming services, etc. Therefore, the amount of data to be processed by network devices and/or throughput requirements for network devices is increasing. Moreover, the majority of internet web traffic is Transmission Control Protocol (TCP) based web traffic, which causes a significant overhead for the network devices to process TCP based web traffic.

Offload approaches may be used in network device to reduce network stack processing overheads. For example, a network device may use a large receive offload (LRO) technique to reduce a reception stack overhead for packet reception processing. LRO is a technique for increasing throughput by reducing utilization of a system central processing unit (CPU). The LRO technique works by aggregating incoming packets from Ethernet Layer belonging to a single data stream into larger packets and delivering the larger packets to an upper TCP layer, so as to alleviate a burden of the network device processing headers of the packets. Specifically, the incoming packets from the Ethernet Layer are stored in an LRO ring to be aggregated. In practice, the network device usually comprises a plurality of LRO rings for storing incoming packets from a plurality of data streams to further perform LRO aggregation.

The LRO rings, being a storage device as memory, are precious resources for the network device in a hardware point of view, which is expected to be utilized as efficient as possible. In the prior art, allocating LRO rings to data streams takes a first-in-first-out fashion, without considering any properties of data streams from the Ethernet Layer, which might utilize the LRO rings inefficiently. Therefore, how to utilize the LRO rings efficiently is a significant objective in the field.

SUMMARY

It is therefore a primary objective of the present invention to provide a large receive offload (LRO) allocation method and a network device capable of utilizing the LRO rings efficiently.

The present invention discloses a allocation method, utilized in a network device comprising an LRO engine. The LRO engine comprises a plurality of LRO rings. The allocation method comprises receiving a plurality of packets which belong to a plurality of data streams; recording information of the plurality of data streams according to the plurality of packets; determining a plurality of priority values corresponding to the plurality of data streams according to the information of the plurality of data streams; determining a first data stream within the plurality of data streams corresponding to a first priority value which is greater than a predefined value; and when there is an available LRO ring within the plurality of LRO rings, allocating the available LRO ring to the first data stream; wherein when an LRO ring is allocated to a data stream, a plurality of incoming packets of the data stream are stored in the LRO ring, and the plurality of incoming packets stored in the LRO ring are aggregated into large packets by the LRO engine.

The present invention further discloses a network device, comprising a large receive offload (LRO) engine, configured to aggregate incoming packets of a plurality of data streams into large packets, wherein the LRO engine comprises a plurality of LRO rings, configured to store incoming packets of data streams occupying the plurality of LRO rings; a processing unit; and a storage unit, configured to store a program code, wherein the program code instructs the processing unit to perform following steps: receiving a plurality of packets which belong to the plurality of data streams; recording information of the plurality of data streams according to the plurality of packets; determining a plurality of priority values corresponding to the plurality of data streams according to the information of the plurality of data streams; determining a first data stream within the plurality of data streams corresponding to a first priority value which is greater than a predefined value; and when there is an available LRO ring within the plurality of LRO rings, allocating the available LRO ring to the first data stream; wherein when an LRO ring of the plurality of LRO rings is allocated to a data stream, a plurality of incoming packets of the data stream are stored in the LRO ring of the plurality of LRO rings, and the incoming packets stored in the LRO ring are aggregated into large packets by the LRO engine.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
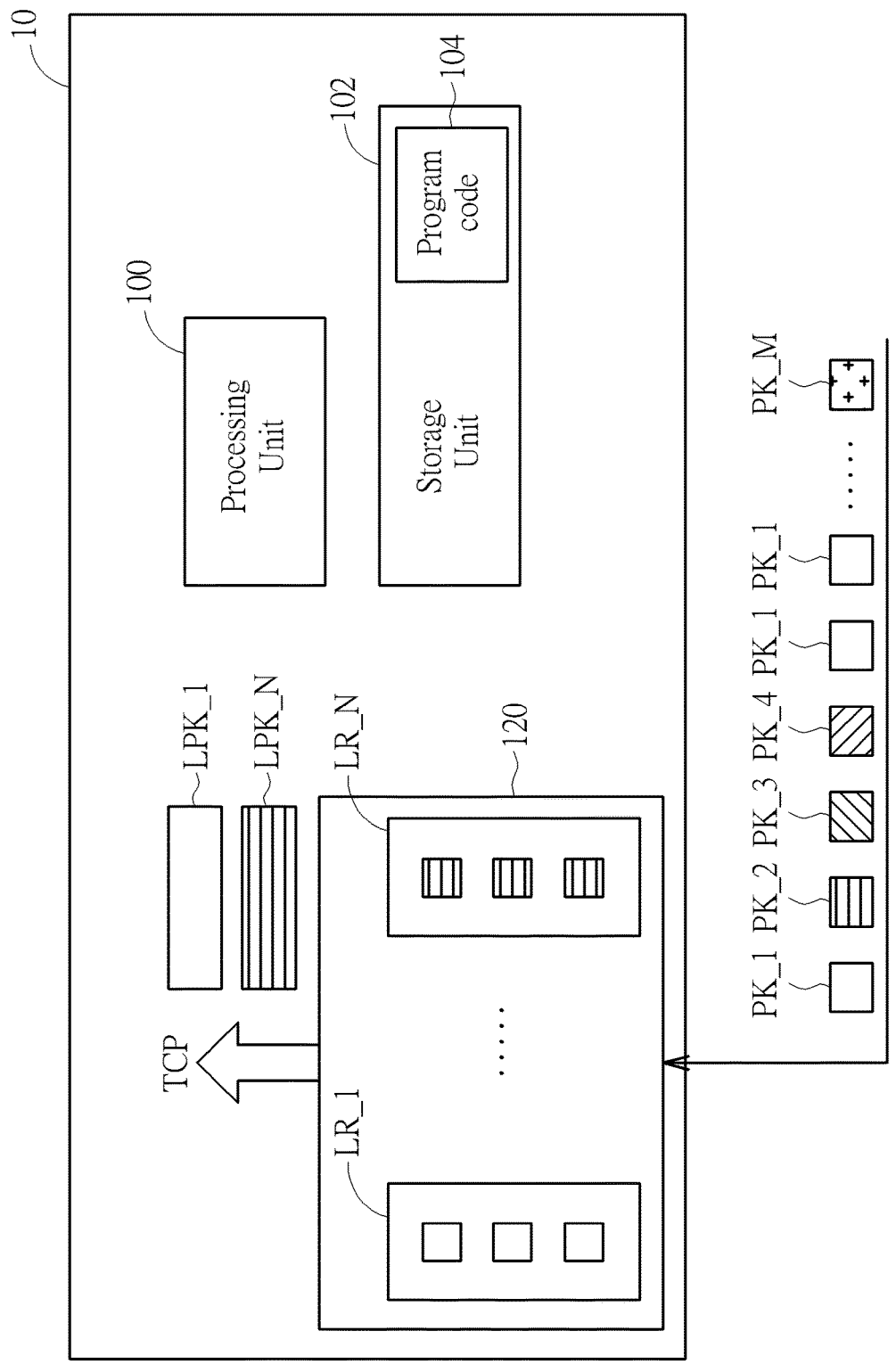
FIG. 1 is a schematic diagram of a network device according to an embodiment of the present invention.

Please refer to FIG. 1, which is a schematic diagram of a network device 10 according to an embodiment of the present invention. The network device 10 may be an electronic device equipped with a network interface card (NIC), such as a router, a wireless access point (AP), or a mobile device with soft AP function, etc. As shown in FIG. 1, the network device 10 comprises a process unit 100, a storage unit 102 and a large receive offload (LRO) engine 120. The LRO engine 120 receives packets PK_1-PK_M from the Ethernet layer. In this example, the packets PK_1-PK_M respectively belong to data streams DS_1-DS_M. The LRO engine 120 comprises LRO rings LR_1-LR_N. The LRO rings LR_1-LR_N are storage devices configured to store incoming packets of data streams which occupy the LRO rings LR_1-LR_N. The LRO engine 120 aggregates the packets stored in the LRO rings LR_1-LR_N into large aggregated packets LPK_1-LPK_N, and delivers the large aggregated packets LPK_1-LPK_N to an upper transmission control protocol (TCP) layer. Specifically, when a data stream DS_x occupies an LRO ring LR_y, the LRO ring LR_y stores incoming packets of the data stream DS_x, and the LRO engine 120 aggregates the packets stored in the LRO ring LR_y into a large aggregated packet LPK_x. On the other hand, for a data stream DS_z which does not occupy any LRO ring, incoming packet of the data stream DS_z would be directly delivered to the upper TCP layer for further processing.

The LRO rings LR_1-LR_N, being storage devices as memory, are precious resources for the network device in a hardware point of view. The LRO rings LR_1-LR_N should be carefully allocated to data streams which indeed benefit a system throughput of the network device 10. For example, some data stream may have a large data amount and be divided into a plenty of small packets. Each small packet contains a small header. Processing the headers of the plenty of small packet would hinder the system throughput, and aggregation of these small packets correspond to a same data stream would alleviation a burden of processing plenty headers of the small packets. On the other hand, some data stream just has a small data amount. Aggregation on packets of the data stream with small data amount would not improve the throughput much. Furthermore, the data stream with small data amount occupying the LRO ring would block the data stream with large data amount being aggregated, causing the LRO rings to be utilized inefficiently.

Figure 2:
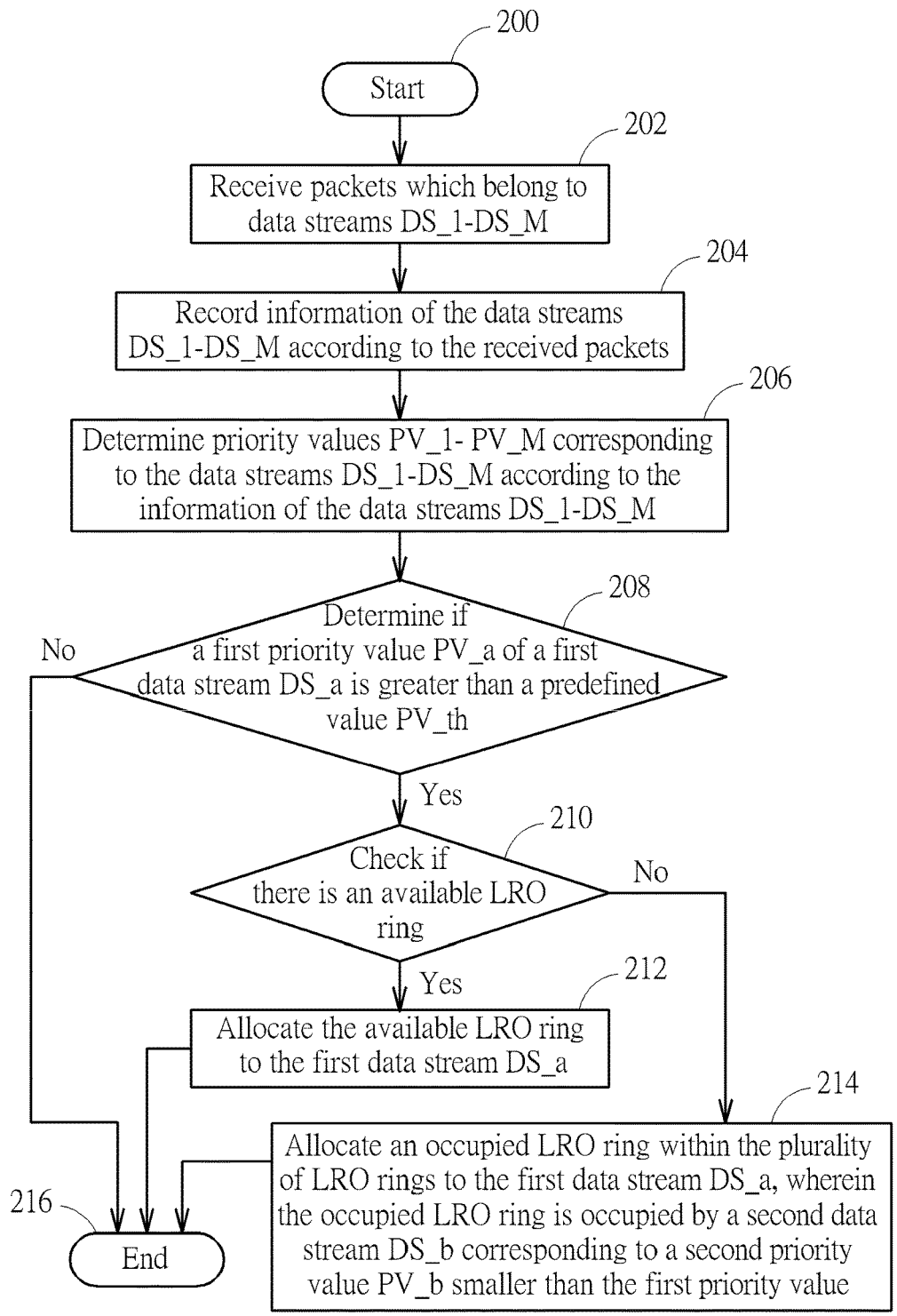
FIG. 2 is a schematic diagram of an LRO allocation process according to an embodiment of the present invention.

Therefore, allocation of LRO rings to data streams may take properties of data streams into consideration. Please refer to FIG. 2, which is a schematic diagram of an LRO allocation process 20 according to an embodiment of the present invention. The LRO allocation process 20 may be compiled as a program code 104, which is stored in the storage unit 102 to instruct the process unit 100 to execute the LRO allocation process 20. The LRO allocation process 20 comprises following steps:

Step 200: Start.

Step 202: Receive packets which belong to data streams DS_1-DS_M.

Step 204: Record information of the data streams DS_1-DS_M according to the received packets.

Step 206: Determine priority values PV_1-PV_M corresponding to the data streams DS_1-DS_M according to the information of the data streams DS_1-DS_M.

Step 208: Determine if a first priority value PV_a of a first data stream DS_a is greater than a predefined value PV_th. If yes, go to Step 210. Otherwise, go to Step 216.

Step 210: Check if there is an available LRO ring. If yes, go to Step 212. Otherwise, go to Step 214.

Step 212: Allocate the available LRO ring to the first data stream DS_a.

Step 214: Allocate an occupied LRO ring within the plurality of LRO rings to the first data stream DS_a, wherein the occupied LRO ring is occupied by a second data stream DS_b corresponding to a second priority value PV_b smaller than the first priority value.

Step 216: End.

The LRO allocation process 20 allocates the available LRO ring to the data streams by taking properties brought by the recorded information of the data streams DS_1-DS_M into consideration. In detail, in Step 202, the network device 10 receives packets from the Ethernet layer, and identifies each of the received packets as the corresponding data streams from the data streams DS_1-DS_M.

In Step 204, the network device 10 records the information of the data streams DS_1-DS_M according to the received packets. The network device 10 may build up a table to record characteristics of the data streams DS_1-DS_M as the information. For example, the network device 10 may accumulate data amounts of the received packets corresponding to each of the data streams DS_1-DS_M for a time period T, so as to calculate the throughput values TP_1-TP_M of the data streams DS_1-DS_M. After the time period T, the throughput values TP_1-TP_M may be re-calculated, which means that the throughput values TP_1-TP_M are updated periodically. In addition, the recorded information of the data streams DS_1-DS_M may further comprise other characteristics of the data streams DS_1-DS_M, such as internet protocol (IP) addresses, transmission control protocol (TCP) ports, virtual local area network (VLAN) tags, etc., of the data streams DS_1-DS_M, and not limited herein.

In Step 206, the network device 10 determines the priority values PV_1-PV_M corresponding to the data streams DS_1-DS_M according to the recorded information of the data streams DS_1-DS_M. The priority values PV_1-PV_M are quantities to represent a priority order of the data streams DS_1-DS_M. Data streams with high priority values are superior to the data streams with low priority values and should be allocated with the LRO rings first. Determination of the priority values PV_1-PV_M may be based on the characteristics of the data streams DS_1-DS_M in general. In an embodiment, the priority values PV_1-PV_M are simply the throughput values TP_1-TP_M, since data streams with high throughput values during the time period T may indicate that these data streams with high throughput values might have large amount of data coming, which should be allocated with the LRO rings first.

In Step 208, the network device 10 determines if the first priority value PV_a of the first data stream DS_a is greater than the predefined value PV_th. Specifically, after the priority values PV_1-PV_M of the data streams DS_1-DS_M are determined, the network device 10 may receive a new incoming packet PK_a, and identify that the packet PK_a belongs to the first data stream DS_a. The network device 10 may look up the table to see if the first priority value PV_a is greater than the predefined value PV_th, so as to make sure that the first data stream DS_a is qualified to occupy an LRO ring.

In Step 210 and Step 212, after the network device 10 makes sure that the first data stream DS_a is qualified to occupy an LRO ring, the network device 10 checks an occupation status of the LRO rings. If there is an available LRO ring, the network device 10 allocates the available LRO ring to the first data stream DS_a.

Otherwise, if none of the LR_1-LR_N is available, in Step 214, the network device 10 allocates a previously occupied LRO ring to the first data stream DS_a. In detail, the network device 10 compares the first priority value PV_a with priority values of all of the data streams currently occupying the LRO rings, selects one of the data streams (say, the second data stream DS_b) currently occupying the LRO rings with a priority value (say, the second priority value PV_b) smaller than the first priority value PV_a, removes the second data stream DS_b from the occupied LRO ring LR_o, and allocates the occupied LRO ring LR_o to the first data stream DS_a. The LRO ring LR_o is no longer occupied by the second data stream DS_b but the first data stream DS_a, if the second priority value PV_b is smaller than the first priority value PV_a. Preferably, in Step 214, the network device 10 may search a third data stream DS_c with a smallest priority value PV_c among all the priority values of the data streams currently occupying the LRO rings, and replace the third data stream DS_c with the first data stream DS_a if the smallest priority value PV_c is smaller than the first priority value PV_a.

The LRO allocation process 20 reserves the LRO rings for data streams with high priority values, so as to utilize the LRO rings efficiently. Notably, the LRO allocation process 20 is an embodiment of the present invention. Those skilled in the art may make modifications and alternations accordingly, and not limited herein. For example, determination of the priority values may also consider other characteristics of the data streams, such as traffic types of the data streams, and not limited herein, as long as the priority values represent the priority order of the data streams for allocating the LRO rings. In addition, the process unit 100 may be a microprocessor or an application-specific integrated circuit (ASIC). The storage unit 102 may be read-only memory (ROM), random-access memory (RAM), non-volatile memory (e.g., an electrically erasable programmable read only memory (EEPROM) or a flash memory), CD-ROMs, magnetic tapes, floppy disks, optical data storage devices, etc., and not limited herein.

In the prior art, allocation of LRO rings to data streams is in a first-in-first-out fashion, which does not consider any characteristics of the data streams, causing the LRO rings utilized inefficiently. In comparison, the embodiment of the present invention considers characteristics of the data streams and allocates the LRO rings to the data streams with high priority value, such that the LRO rings are utilized efficiently.

In summary, the embodiment of the present invention utilizes the priority values to indicate the priority order of the data streams, and reserves the LRO rings for the data streams in need, such that the LRO rings are utilized efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An allocation method, utilized in a network device comprising a large receive offload (LRO) engine, the LRO engine comprising a plurality of LRO rings, the allocation method comprising: receiving a plurality of packets which belong to a plurality of data streams; calculating a plurality of throughput values corresponding to the plurality of data streams: determining whether a first throughput value corresponding to a first data stream is greater than a predefined value; and
    allocating the available LRO ring to the first data stream when there is an available LRO ring within the plurality of LRO rings and the first throughput value corresponding to the first data stream is greater than the predefined value;
    wherein when an LRO ring is allocated to a data stream, a plurality of incoming packets of the data stream are stored in the LRO ring, and the plurality of incoming packets stored in the LRO ring are aggregated into large packets by the LRO engine;
    recording information of the plurality of data streams according to the plurality of packets; determining a plurality of priority values corresponding to the plurality of data streams according to the information of the plurality of data streams; and
    determining whether to allocate the available LRO ring to the first data stream according to the first priority value corresponding to the first data stream; wherein the information of the plurality of data streams comprises internet protocol (IP) addresses, transmission control protocol (TCP) ports, virtual local area network (VLAN) tags of the plurality of data streams.

2. The LRO allocation method of claim 1, wherein the plurality of throughput values are updated periodically.

3. The LRO allocation method of claim 1, further comprising: when there is no available LRO ring, allocating an occupied LRO ring within the plurality of LRO rings to the first data stream, wherein the occupied LRO ring is occupied by a second data stream corresponding to a second throughput value smaller than the first throughput value.

4. A network device, comprising: a large receive offload (LRO) engine, configured to aggregate incoming packets of a plurality of data streams into large packets, the LRO engine comprising a plurality of LRO rings, configured to store incoming packets of data streams occupying the plurality of LRO rings; a processing unit; and a storage unit, configured to store a program code, the program code instructing the processing unit to perform following steps:
    receiving a plurality of packets which belong to the plurality of data streams; calculating a plurality of throughput values corresponding to the plurality of data streams: determining whether a first throughput value corresponding to a first data stream is greater than a predefined value; and
    allocating the available LRO ring to the first data stream when there is an available LRO ring within the plurality of LRO rings and the first throughput value corresponding to the first data stream is greater than the predefined value:
    wherein when an LRO ring of the plurality of LRO rings is allocated to a data stream, a plurality of incoming packets of the data stream are stored in the LRO ring of the plurality of LRO rings, and the incoming packets stored in the LRO ring are aggregated into large packets by the LRO engine;
    wherein the program code further instructs the processing unit to perform the following step: recording information of the plurality of data streams according to the plurality of packets; determining a plurality of priority values corresponding to the plurality of data streams according to the information of the plurality of data streams; and
    determining whether to allocate the available LRO ring to the first data stream according to the first priority value corresponding to the first data stream; wherein the information of the plurality of data streams comprises internet protocol (IP) addresses, transmission control protocol (TCP) ports, virtual local area network (VLAN) tags of the plurality of data streams.

5. The network device of claim 4, wherein the plurality of throughput values are updated periodically.

6. The network device of claim 4, wherein the program code further instructs the processing unit to perform the following step: when there is no available LRO ring, allocating an occupied LRO ring within the plurality of LRO rings to the first data stream, wherein the occupied LRO ring is occupied by a second data stream corresponding to a second throughput value smaller than the first throughput value.

* * * * *